United States Patent [19]
Bennett

[11] Patent Number: 5,870,584
[45] Date of Patent: Feb. 9, 1999

[54] METHOD AND APPARATUS FOR SORTING ELEMENTS

[75] Inventor: Jon C. R. Bennett, Ambridge, Pa.

[73] Assignee: FORE Systems, Inc., Warrendale, Pa.

[21] Appl. No.: 559,610

[22] Filed: Nov. 20, 1995

Related U.S. Application Data

[60] Provisional application No. 60/004,032 Sep. 20, 1995.
[51] Int. Cl.$^6$ ...................................................... G06F 7/06
[52] U.S. Cl. .................... 395/500; 395/607; 364/DIG. 1; 364/222.9; 364/DIG. 2; 364/962.3; 364/965.4
[58] Field of Search .................................. 395/500, 607; 364/200, 900, 222.9, 962.3, 965.4

[56] References Cited

U.S. PATENT DOCUMENTS

| | | | |
|---|---|---|---|
| 4,873,687 | 10/1989 | Breu | 371/8.2 |
| 4,893,302 | 1/1990 | Hemmady et al. | 370/60 |
| 4,899,333 | 2/1990 | Roediger | 370/60 |
| 4,946,045 | 8/1990 | Ditchburn et al. | 209/576 |
| 4,958,341 | 9/1990 | Hemmady et al. | 370/60.1 |
| 4,987,539 | 1/1991 | Moore et al. | 364/413.08 |
| 4,989,257 | 1/1991 | Horowitz | 382/18 |
| 5,130,983 | 7/1992 | Heffner, III | 370/85.8 |

OTHER PUBLICATIONS

"Lazy Queue: An Efficient Implementation of the Pending-event Set", by Ronngren et al., IEEE, Simulation Symposium, 1991, pp. 194–204.

"Zero–One Sorting on the Mesh", by Krizanc et al., IEEE, Parallel and Distributed Processing, 1993 Symposium (5th), pp. 641–647.

"Using Difficulty of Prediction to Decrease Computation: Fast Sort, Priority Queue and Convex Hull on Entropy Bounded Inputs", by Chen et al. IEEE, Foundations of Computer Science, 1993 34th Annual Symposium, pp. 104–112.

"Sequential decoding of convolutional codes by a compressed multiple queue algorithm", by Kuo et al., IEEE, Proceedings–Communications, vol. 141, No. 4, Aug. 1994, pp. 212–222.

"An Implementation of the Generalized Stack Algorithm Using a Partially Sorting Algorithm", by Achtmann et al., IEEE, Singapore ICCS '94, pp. 129–133.

"A Heep of Data", by I. Beichl and F. Sullivan, IEEE ComputationalScience & Engineering, Jun. 1996, pp. 11–14.

*Primary Examiner*—Kevin J. Teska
*Assistant Examiner*—Russell W. Frejd
*Attorney, Agent, or Firm*—Ansel M. Schwartz

[57] ABSTRACT

The present invention pertains to a method for sorting. The method comprises the steps of forming a decision tree comprised of at least a first level having at least a first entry with either a first result or a second result corresponding to values as they fill a queue. Then, there is the step of reading the result in the first entry of the first level of the decision tree. Next, there is the step of choosing the value in the first entry of the first level from the queue corresponding to the result in the first entry. The present invention comprises a priority queue. The priority queue comprises an array in which elements are stored. Also, the priority queue comprises a controller which stores the elements in the array with no memory reads and a constant number of memory writes so a smallest element in the array can be identified.

8 Claims, 7 Drawing Sheets

ELEMENTS STORED IN A PRIORITY QUEUE AT INCREASING CONTIGUOUS MEMORY LOCATIONS.

VALUES OF DECISION TREE ELEMENTS FOR EXAMPLE IN FIG.1

FIG. 10

```
                                    DT
                        [1]          2
CL
2 [4]            [1]            [0]  1
1 [5]
0 [1] ̷5̷ ̷6̷   [0]    [1]    [0]    [0]  0
         ┌───┬───┬───┬───┬───┬───┬───┬───┐
LAST [3] ̷5̷ ̷7̷ ̷4̷ │ 5 │ 7 │ 6 │ 4 │ 1 │ 3 │ X │ X │  ADDRESS-BIT
         └───┴───┴───┴───┴───┴───┴───┴───┘
NE=6           0   0   0   0   1   1   1   1     LEVEL-2
               0   0   1   1   0   0   1   1     LEVEL-1
               0   1   0   1   0   1   0   1     LEVEL-0
```

FIG. 11

```
                                    DT
                        [1]          2
CL
2 [4]            [1]            [0]  1
1 [1] ̷5̷
0 [1] ̷5̷ ̷6̷   [0]    [1]    [0]    [0]  0
         ┌───┬───┬───┬───┬───┬───┬───┬───┐
LAST [9] ̷5̷ ̷7̷ ̷4̷ │ 5 │ 7 │ 6 │ 4 │ 1 │ 3 │ 9 │ X │  ADDRESS-BIT
         └───┴───┴───┴───┴───┴───┴───┴───┘
NE=7  ̷6̷       0   0   0   0   1   1   1   1     LEVEL-2
               0   0   1   1   0   0   1   1     LEVEL-1
               0   1   0   1   0   1   0   1     LEVEL-0
```

FIG. 12

```
                                    DT
                        [1]          2
CL
2 [4]            [1]            [0]  1
1 [1] ̷5̷
0 [9] ̷5̷ ̷6̷   [0]    [1]    [0]    [0]  0
          ┌───┬───┬───┬───┬───┬───┬───┬───┐
LAST [10] ̷5̷ ̷7̷ ̷4̷ │ 5 │ 7 │ 6 │ 4 │ 1 │ 3 │ 9 │10 │  ADDRESS-BIT
          └───┴───┴───┴───┴───┴───┴───┴───┘
NE=8  ̷6̷ ̷9̷     0   0   0   0   1   1   1   1     LEVEL-2
               0   0   1   1   0   0   1   1     LEVEL-1
               0   1   0   1   0   1   0   1     LEVEL-0
```

METHOD AND APPARATUS FOR SORTING ELEMENTS

RELATED APPLICATIONS

This application claims priority from provisional application Ser. No. 60/004,032 filed Sep. 20, 1995.

FIELD OF THE INVENTION

The present invention is related to a priority queue. More specifically, the present invention is related to an algorithm to implement a priority queue that requires very little storage beyond that which is required to hold the elements in the queue. With this algorithm and parallel hardware, it is possible to insert elements into the queue with no memory reads and a constant number of memory writes.

BACKGROUND OF THE INVENTION

There are four operations that usually need to be performed on a priority queue.
Finding the first element in the queue
Inserting an element into the queue
Deleting an element from the queue
Changing an element in the queue The quality of an algorithm and that of its implementation, is measurable based on the efficiency with which these operations can be performed. The efficiency is in terms of the number of memory read/write operations, and the number of compare operations necessary. As an example, consider a priority queue implemented as a linked list of elements arranged in increasing order of priority. Insertion of an element requires traversing the linked list until the position of the element in the linked list is found, and then inserting the element in the list. Similarly deleting an element and changing an element also require traversing the list until the element is located. In the worst case, the entire list of elements would need to be traversed.

In addition to the efficiency of the above operations an algorithm may be measured based on the amount of space it consumes beyond that to hold the elements of the queue.

The present invention is an algorithm to implement a priority queue that requires very little storage beyond that which is required to hold the elements in the queue. With this algorithm and parallel hardware it is possible to insert elements into the queue with no memory reads and a constant number of memory writes, in the worst case.

The priority queueing problem (or more generally, the sorting problem) is defined as the problem of ordering a list of objects according to some linear order. For example, integers may be ordered in increasing or decreasing order of their numerical value.

SUMMARY OF THE INVENTION

The present invention pertains to a method for sorting. The method comprises the steps of forming a decision tree comprised of at least a first level having at least a first entry with either a first result or a second result corresponding to values as they fill a queue. Then, there is the step of reading the result in the first entry of the first level of the decision tree. Next, there is the step of choosing the value in the first entry of the first level from the queue corresponding to the result in the first entry.

The present invention pertains to a method for sorting. The method comprises the steps of forming a decision tree comprised of N levels, where N is greater than or equal to one and is an integer and corresponds to a queue of twin elements each having a value. As the queue is filled, each level L having tile entries where L is greater than or equal to 0 and is an integer. Each entry has either a first result or a second result corresponding to the value in the queue. Then, there is the step of reading the results in the entry of the 0th level. Next, there is the step of reading the results in the entries of subsequent higher levels, if any, depending on the result read in a previous lower level. Then, there is the step of choosing the value from the queue corresponding to the result in the entry in a highest level.

The present invention pertains to an apparatus for sorting. The apparatus comprises an array E of size $2^N$ where elements are stored and where $N \geq 1$ and is an integer, with the elements in array E indexed from 0 to $2^N-1$. The apparatus comprises a first memory maintaining a value NE equal to how many elements are stored in the array E. There is a decision tree of $2^N-1$ bits, where the number of bits in its part I is $2^N/2^{I+1}$, which describes the relative ordering of elements in array E. Moreover, the apparatus comprises a comparison list array CL of size N, where CL[i] contains a value of a lower element within E[l] and E[h] where:

$$l = \left\lfloor \frac{NE - 1 - 2^i}{2^{i+1}} \right\rfloor 2^{i+1}; \text{ and}$$

$$l + 2^i - 1 = h$$

The apparatus comprises a second memory maintaining a value L equal to the value of the last element in the array. Also, the apparatus comprises a controller which inserts elements into array E in contiguous memory locations in an unsorted manner, modifies the decision tree to describe the relative ordering of the elements of the array E, modifies the array CL so CL[i] contains the value of a lower element within E[l] and E[h]; updates the value L with the value of each new element added to the array E, and updates the value NE as each new element is added to the array E.

The present invention comprises a priority queue. The priority queue comprises an array in which elements are stored. Also, the priority queue comprises a controller which stores the elements in the array with no memory reads and a constant number of memory writes so a smallest element in the array can be identified.

The present invention pertains to a method for manipulating elements. The method comprises the steps of storing a first element having a first value in a first queue location in an element queue having a size which stores $2^N$ elements, where $N \geq 2$ and is an integer. Then, there is the step of updating in a register how many elements are in the queue and the first value of the first element. Next, there is the step of storing a second element having a second value in a second queue location of the element queue contiguously with the first element. Then, there is the step of updating in the register how many elements are in the queue and the second value of the second element. Next, there is the step of comparing the second value of the second element with the first value of the first element to yield a first comparison result corresponding to which value of the first and second elements is larger. Then, there is the step of storing a first comparison result in a first location of a plurality of locations of a decision tree. The plurality of locations correspond to a plurality of levels. Next, there is the step of updating a first comparison element of a plurality of comparison elements of a comparison list array. Each comparison element is associated with a level of the plurality of levels. The comparison element updated corresponds to the second queue location of the element queue in which the second element is stored and in the first queue location of the element queue in which the first element is stored. Then, there is the step of storing a third element having a third value in a third queue location in the element queue contiguously with the second element. Next, there is the step of updating in the register how many elements are in the queue and the third value of the third element. Then, there is the step of comparing the third value of the third element with the value of the first and second elements which is smaller to yield a second comparison result corresponding to which value of the first and second elements and the third element is smaller. Next, there is the step of storing the second comparison result in a second location of the decision tree. Then, there is the step of updating a second comparison element corresponding to the third queue location in which the third element is stored. Next, there is the step of storing a fourth element having a fourth value in a fourth queue location in the element queue contiguously with the third element. Then, there is the step of updating in the register how many elements are in the queue and the fourth value of the fourth element. Next, there is the step of comparing the fourth value of the fourth element with the third element to yield a third comparison result corresponding to which value of the third and fourth elements is smaller. Then, there is the step of storing the third comparison result in a third location of the decision tree. Next, there is the step of comparing the third value of the third element and fourth element which is smallest with the value of the first element and second element which is smallest to yield a fourth comparison result corresponding to which value of the first, second, third or fourth elements is smaller. Then, there is the step of storing the fourth comparison result in the second location of the decision tree. Next, there is the step of updating the comparison list. Then, there is the step of changing the third value of the third element in the element queue to a new value. Next, there is the step of comparing the new value to the fourth value of the fourth element to yield a fifth comparison result. Then, there is the step of storing the fifth comparison result in the third location of the decision tree. Next, there is the step of comparing the fifth comparison result with the first comparison result of the decision tree to obtain a sixth comparison result. Then, there is the step of storing the sixth comparison result in the second location of the decision tree. Next, there is the step of updating the comparison list. Then, there is the step of finding the queue location in the element queue which has the smallest value by only reading the comparison results in the decision tree. Next, there is the step of obtaining the smallest value.

BRIEF DESCRIPTION OF THE DRAWINGS

In the accompanying drawings, the preferred embodiment of the invention and preferred methods of practicing the invention are illustrated in which:

FIG. 10 shows the step-6 in regard to the insertion of elements.

FIG. 11 shows the step-7 in regard to the insertion of elements.

FIG. 12 shows the step-8 in regard to the insertion of elements.

DESCRIPTION OF THE PREFERRED EMBODIMENT

Figure 1:
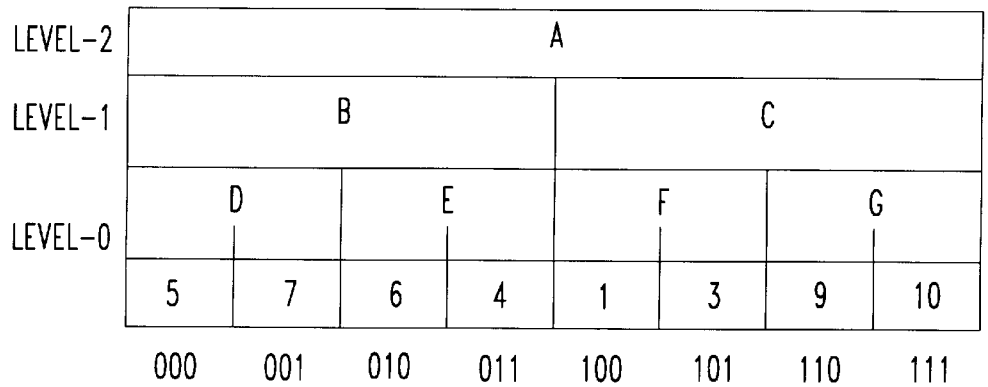
FIG. 1 shows elements stored in a priority queue at increasing contiguous memory locations.
Figure 2:
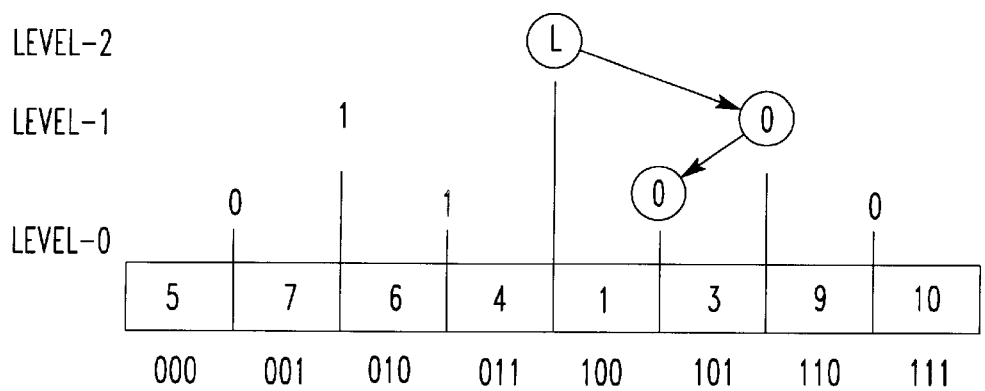
FIG. 2 shows values of decision tree elements for the example of FIG. 1.
Figure 1A:
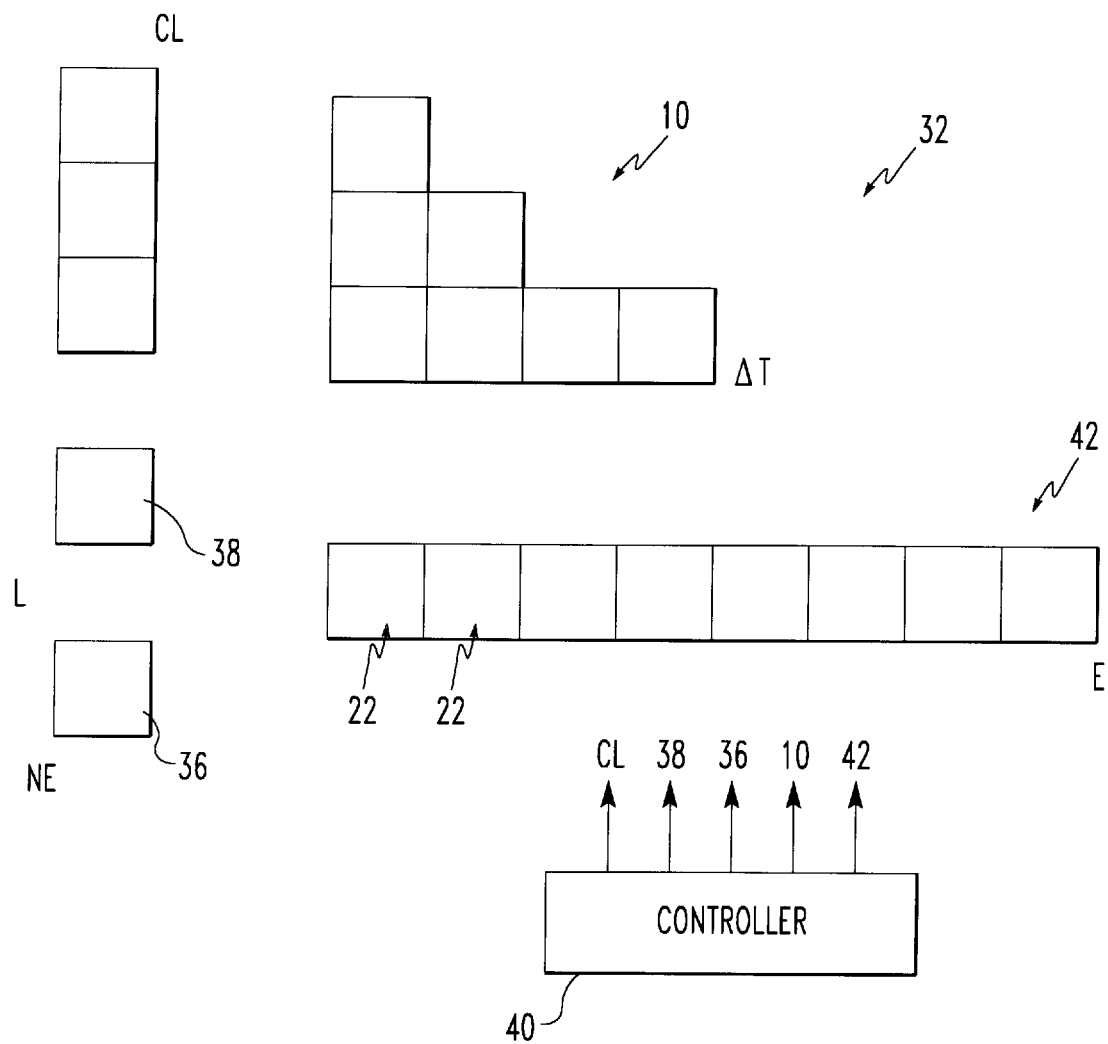
FIG. 1a is a schematic representation of an apparatus for sorting of the present invention.

Referring now to the drawings wherein like reference numerals refer to similar or identical parts throughout the several views, and more specifically to FIG. 1a thereof, there is shown an apparatus 32 for sorting. The apparatus 32 comprises an array E of size $2^N$ where elements 22 are stored and where $N \geq 1$ and is an integer, with the elements 22 in array E indexed from 0 to $2^N-1$. The apparatus 32 comprises a first memory 36 maintaining a value NE equal to how many elements 22 are stored in the array E. There is a decision tree 10 of $2^N-1$ bits, where the number of bits in its part I is $2^N/2^{i+1}$, which describes the relative ordering of elements 22 in array E. Moreover, the apparatus 32 comprises a comparison list array CL of size N, where CL[i] contains a value of a lower element within E[l] and E[h] where:

$$l = \left\lfloor \frac{NE - 1 - 2^i}{2^{i+1}} \right\rfloor 2^{i+1}; \text{ and}$$

$$l + 2^i - 1 = h$$

The apparatus 32 comprises a second memory 38 maintaining a value L equal to the value of the last element in the array. Also, the apparatus 32 comprises a controller 40 which inserts elements 22 into array E in contiguous memory locations in an unsorted manner, modifies the decision tree 10 to describe the relative ordering of the elements 22 of the array E, modifies the array CL so CL[i] contains the value of a lower element within E[l] and E[h]; updates the value L with the value of each new element added to the array E, and updates the value NE as each new element is added to the array E.

The present invention comprises a priority queue. The priority queue comprises an array 42 in which elements 22 are stored. Also, the priority queue comprises a controller 40 which stores the elements 22 in the array 42 with no memory reads and a constant number of memory writes so a smallest element in the array 42 can be identified.

The present invention pertains to a method for sorting. The method comprises the steps of forming a decision tree 10 comprised of at least a first level 12 having at least a first entry 14 with either a first result 16 or a second result 18 corresponding to values as they fill a queue 20. Then, there is the step of reading the result in the first entry 14 of the first level 12 of the decision tree 10. Next, there is the step of choosing the value in the first entry 14 of the first level 12 from the queue 20 corresponding to the result in the first entry 14.

The present invention pertains to a method for sorting. The method comprises the steps of forming a decision tree 10 comprised of N levels, where N is greater than or equal to one and is an integer and corresponds to a queue 20 of twin elements 22 each having a value. As the queue 20 is filled, each level L having tile entries where L is greater than or equal to 0 and is an integer. Each entry has either a first result 16 or a second result 18 corresponding to the value in the queue 20. Then, there is the step of reading the results in the entry of the 0th level. Next, there is the step of reading the results in the entries of subsequent higher levels, if any, depending on the result read in a previous lower level. Then, there is the step of choosing the value from the queue 20 corresponding to the result in the entry in a highest level.

Preferably, L is greater than or equal to one and the step of reading the results in the entries of the subsequent higher levels includes the step of reading the entry in the first level 12 depending on the result in the entry in the 0th level. Additionally, the choosing step preferably includes the step of choosing the value from the queue 20 corresponding to the result read in the entry of the first level 12. The forming step preferably includes the steps of writing a first value 24 into the first element 26 of the queue 20. Then, there is the step of reading a second value 28 into the second element 30 of the queue 20. Next, there is the step of comparing the second value 28 with the first value 24. Then, there is the step of reading the first result 16 or second result 18 into a corresponding entry of the first level 12 for the corresponding elements depending on whether the first value 24 is greater than or less than the second value 28, respectively. Next, there is the step of repeating the step of writing, comparing and writing a third value 32 in regard to the second value 28 and a corresponding entry. Next, there is the step of comparing the third value 32 to the smallest of the first and second values, and writing the first result 16 or second result 18 into a corresponding entry of the 0th level for the corresponding elements depending on whether the third value 32 is greater than or less than the second value 20, respectively.

The present invention pertains to a method for manipulating elements 22. With reference to FIGS. 5–8, the method comprises the steps of storing a first element 26 having a first value 24 in a first queue location in an element queue 20 having a size which stores $2^N$ elements, where $N \geq 2$ and is an integer. Then, there is the step of updating in a register how many elements 22 are in the queue 20 and the first value 24 of the first element 26. Next, there is the step of storing a second element 30 having a second value 28 in a second queue location of the element queue 20 contiguously with the first element 26. Then, there is the step of updating in the register how many elements 22 are in the queue 20 and the second value 28 of the second element 30. Next, there is the step of comparing the second value 28 of the second element 30 with the first value 24 of the first element 26 to yield a first comparison result corresponding to which value of the first and second elements is larger. Then, there is the step of storing a first comparison result in a first location of a plurality of locations of a decision tree 10. The plurality of locations correspond to a plurality of levels. Next, there is the step of updating a first comparison element of a plurality of comparison elements of a comparison list array. Each comparison element is associated with a level of the plurality of levels. The comparison element updated corresponds to the second queue location of the element queue 20 in which the second element 30 is stored and in the first queue location of the element queue 20 in which the first element 26 is stored. Then, there is the step of storing a third element 30 having a third value 32 in a third queue location in the element queue 20 contiguously with the second element 30. Next, there is the step of updating in the register how many elements 22 are in the queue 20 and the third value 32 of the third element 33. Then, there is the step of comparing the third value 32 of the third element 33 with the value of the first and second elements which is smaller to yield a second comparison result corresponding to which value of the first and second elements and the third element 33 is smaller. Next, there is the step of storing the second comparison result in a second location of the decision tree 10. Then, there is the step of updating a second comparison element corresponding to the third queue location in which the third element 33 is stored. Next, there is the step of storing a fourth element 35 having a fourth value 37 in a fourth queue location in the element queue contiguously with the third element 33. Then, there is the step of updating in the register how many elements 22 are in the queue 20 and the fourth value 37 of the fourth element 35. Next, there is the step of comparing the fourth value 37 of the fourth element 35 with the third element 33 to yield a third comparison result corresponding to which value of the third and fourth elements is smaller. Then, there is the step of storing the third comparison result in a third location of the decision tree 10. Next, there is the step of comparing the third value 32 of the third element 33 and fourth element which is smallest with the value of the first element and second element which is smallest to yield a fourth comparison result corresponding to which value of the first, second, third or fourth elements is smaller. Then, there is the step of storing the fourth comparison result in the second location of the decision tree 10. Next, there is the step of updating the comparison list. Then, there is the step of changing the third value 32 of the third element 33 in the element queue 20 to a new value. Next, there is the step of comparing the new value to the fourth value 37 of the fourth element 35 to yield a fifth comparison result. Then, there is the step of storing the fifth comparison result in the third location of the decision tree 10. Next, there is the step of comparing the fifth comparison result with the first comparison result of the decision tree 10 to obtain a sixth comparison result. Then, there is the step of storing the sixth comparison result in the second location of the decision tree 10. Next, there is the step of updating the comparison list. Then, there is the step of finding the queue location in the element queue 20 which has the smallest value by only reading the comparison results in the decision tree 10. Next, there is the step of obtaining the smallest value.

The comparison list maintains the lowest value of an element of a corresponding portion of the array 42. By the comparison list having these lowest values of elements for corresponding portions of the array 42, when a new element needs to be inserted into the array 42 or an element needs to be inserted into the array 42 or an element needs to be deleted from the array 42, the effect on the decision tree of such an insertion or deletion can be realized without having to read through the entire array 42. In fact, the array 42 does not have to be read at all.

In the event an element is being inserted into the array 42, then the value of the comparison list corresponding to the opposing related location of the array 42 in which the element is being inserted, is compared to the value of the element being inserted. If the value of the inserted element is smaller than the value of the comparison list corresponding to the opposing related location in which the new element is being inserted, then the decision tree must be modified accordingly to reflect the fact that a new element with a smaller value than what currently exists in the relevant portion of the array 42, is now present. This modification of the decision tree may be decision tree wide, or localized to only certain portions of the decision tree depending on the value of the new element relative to the lowest value of the other elements in the array 42 at various portions of the array 42 and identified in the comparison list. The decision tree is then changed as described in the example below.

For clarification purposes, if an element is being inserted into the right half of the array 42, then the value of the element being inserted is compared to the value in the comparison list which corresponds to the left side of the array 42 to determine whether any change in the decision tree because of the insertion of the new element is necessary. In regard to the array 42 and this example, the left side is the "opposing related portion" of the array 42 to the right side in which the element is being inserted. This example is applicable to any portion of the array 42 subject to a comparison in regard to the comparison list. There will always be a "right" side and a "left" side and thus an "opposing related portion" in regard to an element being inserted or deleted into the array 42.

In similar fashion, the comparison list serves to eliminate the need to read the array 42 when an element is deleted to amend the decision tree to reflect the value hierarchy of these elements in the array 42 after the deletion of an element. When the element is deleted, the value of the deleted element is compared to the value of the element in the comparison list whose location corresponds to the opposing related location from which the element is being deleted. If the deleted element has a value which is also in the comparison list, then this value is deleted from the comparison list and the next smallest value in the relevant portion of the array 42 from which the element was deleted replaces the value which is deleted. The decision tree is amended accordingly to reflect this change. If the value of the element deleted from the array 42 is greater than the value of the comparison list which corresponds to the opposing related location of the array 42 from which the element is deleted, then no change to the decision tree is necessary. However, if the array 42 is subsequently consolidated by, for instance, moving each element to the right of the deleted element in the array 42, one cell to the left to fill the empty cell, and so on, then the procedure for insertion explained above, for each element, is applied.

The queue can be made very large to accommodate the loads placed on it, with the decision tree, comparison list element array, etc. all being of a corresponding size. Alternatively, the queue can actually be formed by creating a hierarchy of queues with the lowest level in the hierarchy containing the actual elements being sorted. Each queue in the hierarchy of queues could have an associated decision tree, comparison list, etc. or there could be a single decision tree, comparison list, etc. for all the queues, or a combination of these two embodiments.

In the operation of the algorithm, the algorithm inserts elements in contiguous memory locations in an unsorted manner and maintains other information that describes the relative ordering of the elements. This information is called a decision tree. An example will make this clearer.

Consider 8 integers 5, 7, 6, 4, 1, 3, 9, and 10, located in contiguous increasing memory locations as shown in FIG. 1.

The elements are not stored contiguously sorted. The element ordering is indicated by other information, namely the elements A, B, C, D, E, F, G. These are binary elements, which means that they can take one of the two values 0 and 1. These elements contain information on different parts of the queue depending on their level. Element A, which is at level-2 indicates which half of the queue contains the smallest element. A value of A=1 means that the smallest element is in the right half. Conversely, a value of A=0 means that the smallest element is in the left half of the queue.

Elements B and C which are at level-1 each contain information on one half of the queue. B contains information about the left half of the queue, while C contains information about the right half of the queue. B=1 implies that the smallest element in its half of the queue is in the right quarter, and B=0 implies that the smallest element in its half of the queue is in the left quarter.

In a self-similar manner, elements D, E, F and G contain information about the quarter queue that they are associated with an example D is associated with the left quarter of the queue. D=1 means that the smallest element in that quarter is to the right, and D=0 means that the smallest element in that quarter is to the left.

Therefore for the example values in the priority queue considered the values of A, B, C, D, E, F and G are as in FIG. 1.

With this structure it is very easy to find the address of the smallest element in the priority queue. To find the address the decision-tree is read from the highest-level. The value at a given level (0 or 1) determines the direction from which the next element is read. A value of I is an indication is to move to the right when reading down the tree and a value of left is to move to the left. Using these rules the tree is read as shown by the arrows in the above figure. Hence the smallest element must be at address 100. The element at 100 is I which IS the smallest in the queue.

Thus, two structures have been identified at this point.

Figure 2A:
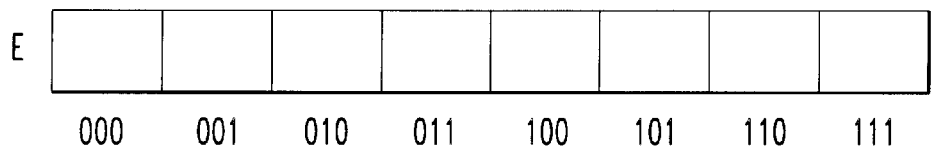
FIG. 2a shows an array E.

As shown in FIG. 2a, the array E stores the values being enqueued, elements are added from left to right. When elements are removed from the array, the location occupied by the removed element is filled with the element in the right-most location in the array. This ensures that the elements are stored contiguously in the array.

Figure 2B:
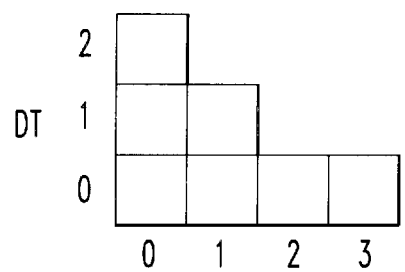
FIG. 2b shows a decision tree DT.

As shown in FIG. 2b, the DT contains the results of comparisons between the elements in the queue.

In a typical implementation, the queue E is maintained in slower main-memory, while the DT is maintained in a high-speed register. The goal of this algorithm is to minimize accesses to the main memory.

DT[0][0]=1, means that E[0]$\geq$E[1]
DT[0][0]=0, means that E[0]$\leq$E[1]
DT[0][1]=1, means that E[2]$\geq$E[3].

The entries in the next level of the DT indicate where in a group of four elements in E the smallest element is located, so DT[1][0]=0 means min(E[0],E[1])<=min(E[2],E[3])
DT[1][0]=1 means min(E[0],E[1])=>min(E[2],E[3])
so to find the smallest element in E[0:3], DT[1][0] is consulted, if it is a 0 then the smallest element in E[0:3] is in E[0:1], if it is a 1 then the smallest element is in E[2:3].

The description so far dealt with a queue of 8 (which is $2^3$) elements. An array indexed from 0 (binary 000) through 7 (which binary 111) and a decision tree with 3 levels was maintained. Generalizing this to a queue with $2^N$ elements:

1. An array of size $2^N$, indexed from 0 to N-1. Call this the Entries (E).
2. A word of $2^N-1$ bits with N logical parts, where the number of bits in part I is $2^N/2^{I+1}$. This is the Decision Tree (DT) and is referenced as a 2-D array where the first index (I) is from 0 to N-1 and the second index is from 0 to $2^{(N-1-I)}-1$. Also the number of elements in the queue (NE) and the value of N are kept.

A major goal of this algorithm is to achieve the insertion process with no read-operations from the slower main memory in which the queue (E) is maintained. To meet this goal two other structures needs to be maintained in the fast register-file.

A Comparison List (CL). For a queue of $2^N$ elements, the CL is an array of size N, indexed from 0 to N-1.

The value of the last element inserted into the queue (denoted L)

When there are $2^N$ elements in the queue, the contents of the CL array are:

CL[N-1] contains the smallest element in the left-half of the array E

CL[N-2] contains the smallest element in the left half, of the half that is to the left of the right most element in the array E, CL[N-3] contains the value of the smallest element in the left half of the quarter which is to the left of the right most element in the array E, and so on In general, element CL[i] contains the value of the lower element within the bounds E[l] and E[h] where the lower bound l is given by:

$$l = \left\lfloor \frac{NE - 1 - 2^i}{2^{i+1}} \right\rfloor 2^{i+1}$$

and the upper bound h is given by:

$$l+2^i-1=h$$

Figure 3:
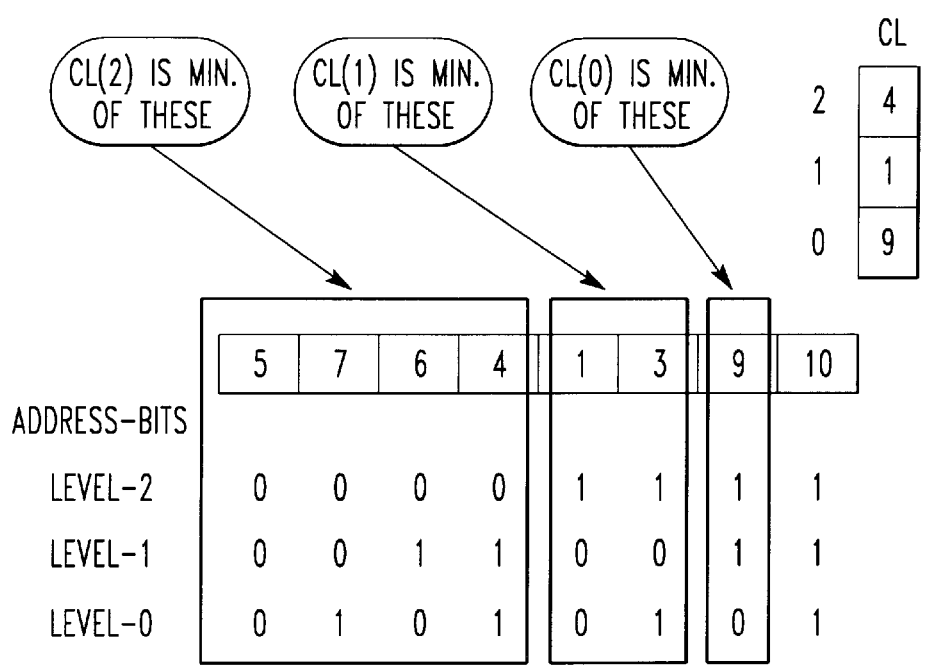
FIG. 3 shows the scope and meaning of elements in array C L.

For the 8 element queue in the previous examples CL is described as in FIG. 3.

If the above example had five elements instead of eight, NE=5. Using the above expressions for l and h, the limits of CL[2] are l=0, h=3. The limits of CL[1] are l=0, h=1, and the limits of CL[0] are l=3, h=3. Hence CL[2] is the minimum of E[0:3] which is 4, CL[1] is the minimum of E[0:1] which is 5, and CL[0] is the minimum of E[3:3] which is 4.

As elements are inserted into contiguous memory locations in the array, only one element of CL needs to be updated after each insertion. The level of the element in CL that must be updated depends on The address I in the array into which insertion is to occur and The previous address(I-1)into which insertion occurred Notice that when the insertion address is incremented by one (to get ready for the insertion), only one bit position of the address changes from a 0 to a 1. The level at which this 0 to 1 change occurs corresponds to the CL level that must be updated. A few examples based on our 8-element array will make this clearer.

when inserting into address 101, the address is incremented from 100 to 101. The level-0 bit in the address changed from 0 to 1, hence CL[0] must be updated when inserting into address 100, the address is incremented from 011 to 100. The level-2 bit in the address changed from 0 to 1, hence CL[2] must be updated.

In addition to updating the CL bits, DT bits may also need to be updated whenever a new element is inserted into the queue. To meet the goal of this algorithm, it must be possible to update both, the CL and the DT without reading any existing queue elements from the main memory.

FIGS. 4–13 show the state of the CL and DT bits after insertion of elements into the queue. The same elements that were used in previous examples will be used. Initial values of DT and NE are 0 and those for CL and L are unimportant (denoted by X)

Figure 4:
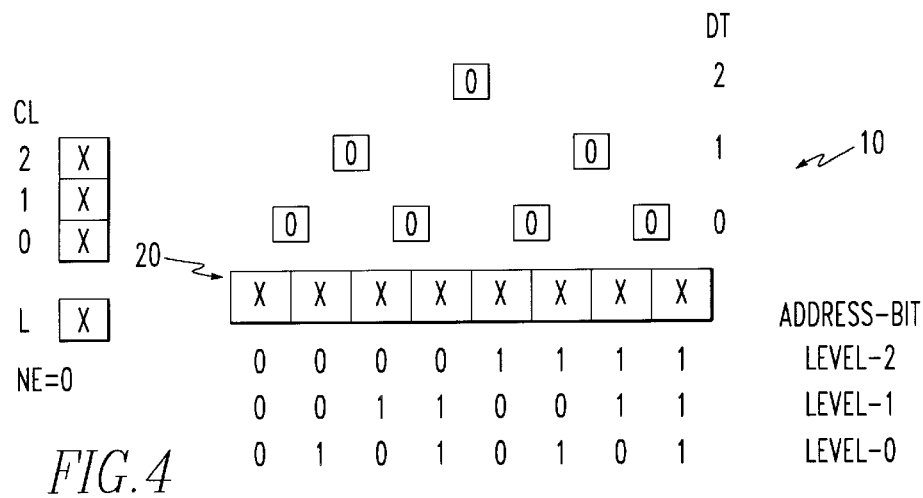
FIG. 4 shows step-0 in regard to the insertion of elements into the queue and the state of the arrays C L, D T and NE.

Step-0: Initial state of the queue, as shown in FIG. 4

Figure 5:
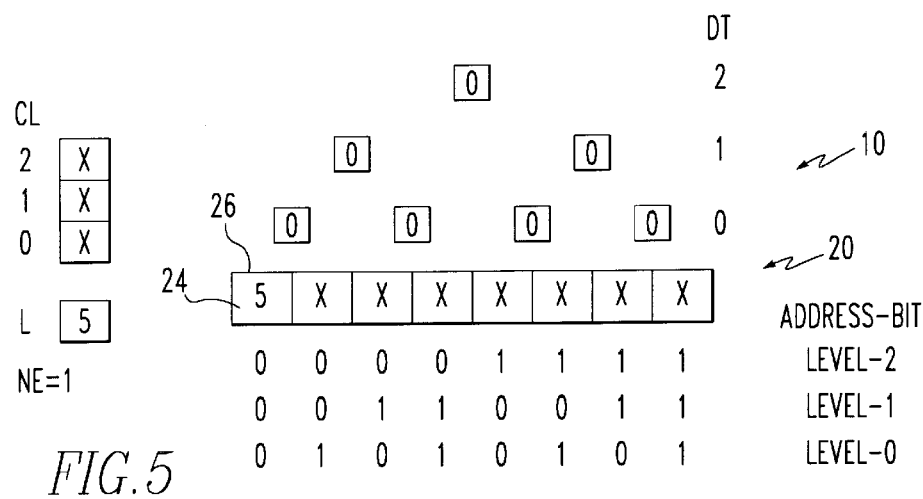
FIG. 5 shows step-1 in regard to the insertion of elements.

Step-1: Write first element 5 into the queue, as shown in FIG. 5

When writing the first element neither CL nor DT are updated. L is updated to 5. NE is incremented to 1.

Figure 6:
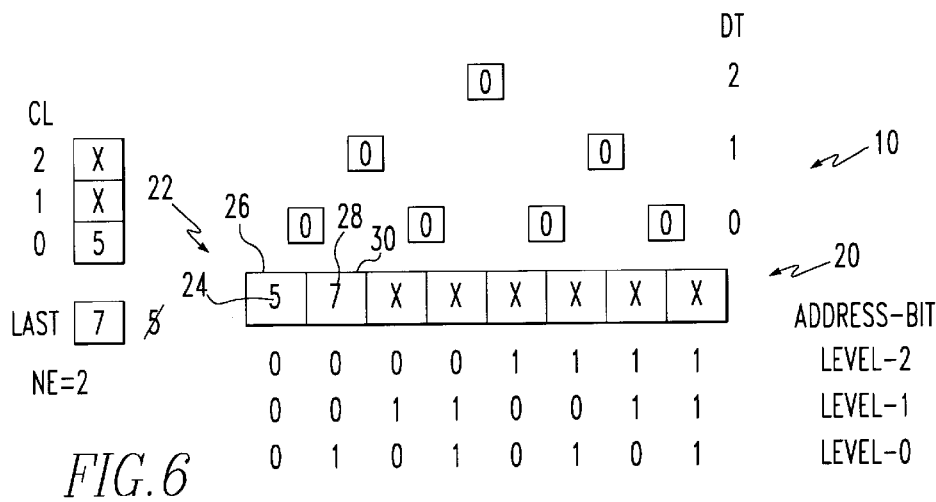
FIG. 6 shows the step-2 in regard to the insertion of elements.

Step 2: Write second element 7 into the queue, as shown in FIG. 6

The second element is written into memory location 001. Since address-bit 0 changed from 0 to a 1, CL[0] must be updated. CL[0] is always updated to be the value of L before the current insertion. This makes CL[0]=5. The corresponding DT is updated by comparing 7 with L before the insertion. Since 7>5, DT[0][0] remains a 0. Finally L is updated to 7, and NE is incremented.

Figure 7:
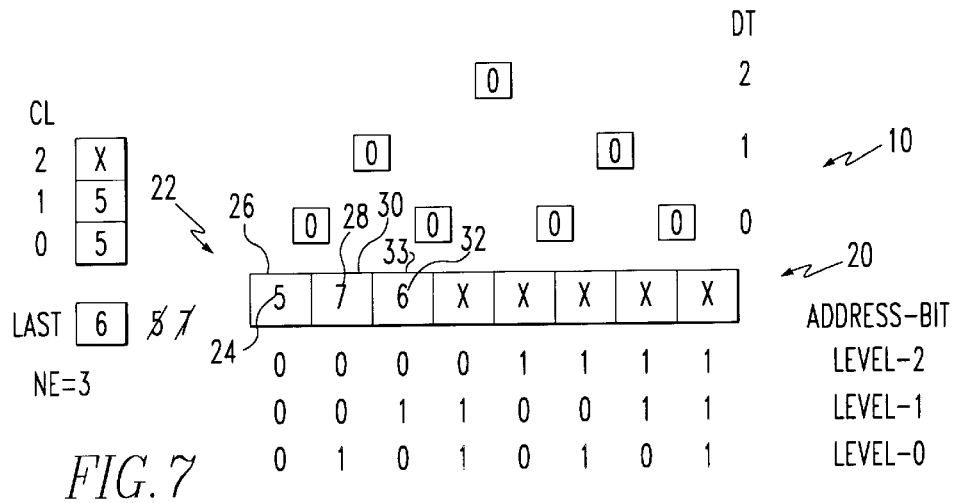
FIG. 7 shows the step-3 in regard to the insertion of elements.

Step 3: Write third element 6 into the queue, as shown in FIG. 7

The third element is written into memory location 010. Since address-bit 1 changed from 0 to a 1, CL[1] must be updated using the following rule:

$$CL[i]=\min(CL[i-1], CL[i-2], \ldots CL[0], L)$$

To do this without comparing values in the CL array, DT is parsed starting from DT[1][0] using the parsing rules for DT. If at a level i in the DT, a 0 is present CL[1] is update with CL[i].

In this example i can only take the value 0. However, this illustrates the general rules for updating CL[j]. CL[j] updated by parsing the DT starting from DT[j][x] (exclusive) until a 0 is present in DT at a level i. Then CL[j] is assigned the value in CL[i] and the process terminates. If no 0 is found as the DT is parsed until the end of the DT, CL[j] is assigned the value in L. In this example a 0 is found in DT[0][0]. Hence CL[1] is updated to be same as CL[0] which is 5.

The rule for updating DT[j][x] is similar to the rule for updating CL[j]. When a 0 is found when parsing the DT at level i, CL[i] is compared with the element being inserted (say e). If e<element in CL[i], then DT[i][x] is a 1, otherwise a 0. If no 0 is found when parsing the DT, e is compared with L. If e<L, DT[j][x] is a 1 otherwise 0.

In this example a 0 is found in DT[0][0]. Hence the element 6 that is being added is compared with 5 (the element in DT[0][0]). Since 6>5, DT[1][0] is unchanged. Finally L is updated to 6, and NE is incremented.

Figure 8:
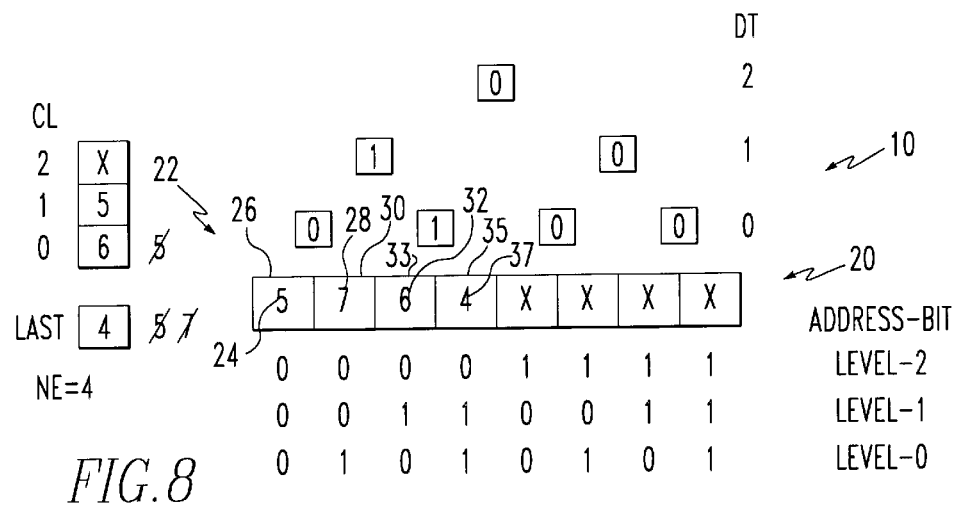
FIG. 8 shows step-4 in regard to the insertion of elements.

Step 4: Write fourth element 4 into the queue, as shown in FIG. 8

The fourth element is written into memory location 011. Since address-bit 0 changed from 0 to a 1, CL[0] must be updated. As usual CL[0] is updated to be the value of L before the current insertion. This makes CL[0]=6. The corresponding DT is updated by comparing 4 with L before the insertion. Since 4<6, DT[0][1] becomes a 1. DT[1][0] may also have to be updated. To check this, as usual, parse DT until a 0 is found. Here it is found at DT[0][0]. Hence compare CL[0] with the element being inserted. Since 4<5, DT[1][0] becomes a 1. Finally L is updated to 4, and NE is incremented.

Figure 9:
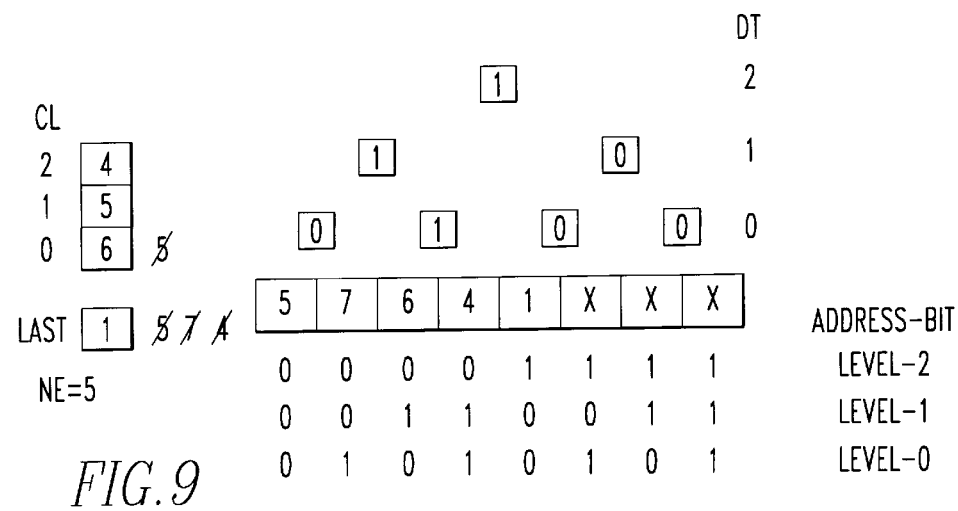
FIG. 9 shows the step-5 in regard to the insertion of elements.

Step 5: Write fifth element 1 into the queue, as shown in FIG. 9

The fifth element is written into memory location 100. Since address-bit 2 changed from 0 to a 1, CL[2] must be updated. Using the parsing rules for DT starting from DT[2][0] exclusive, no 0 is found until the end. Hence CL[2] is updated with L which is 4. Also, since no 0 is found the value in L is compared with the element to be inserted (which is 1). Since 1<4, DT[2][0] becomes 1. Finally L is updated to 1, and NE is incremented.

The process for inserting elements may be summarized in the following steps:

Determine which address bit-position (say p) goes from 0 to 1 during address increment Update CL[p] by searching for a 0 in DT starting from DT[p][x] exclusive. If a 0 is found at level q in the DT, CL[p]=CL[q]. Else CL[p]=L.

Update DT starting from the highest level. The rule for updating DT is as follows: The rule for updating DT[j][x] is similar to the rule for updating CLU]. When a 0 is found when parsing the DT at level i, CL[i] is compared with the element being inserted (say e). If e<element in CL[i], then DT[i][x] is a 1, otherwise a 0. If no 0 is found when parsing the DT, e is compared with L. If e<L, DT[j][x] is a 1 otherwise 0.

Update L, to be the entry to be inserted.

Insert entry

The other three elements are added to the queue similarly. The state after each further step is shown in the following figures.

Step 6: Write sixth element 3 into the queue, as shown in FIG. 10

Step 7: Write seventh element 9 into the queue, as shown in FIG. 11

Step 8: Write eighth element 10 into the queue, as shown in FIG. 12

Changing the value of an element in the queue involves two steps.

The entry in E is changed to the new value

Any needed changes to the DT are made.

Figure 13:
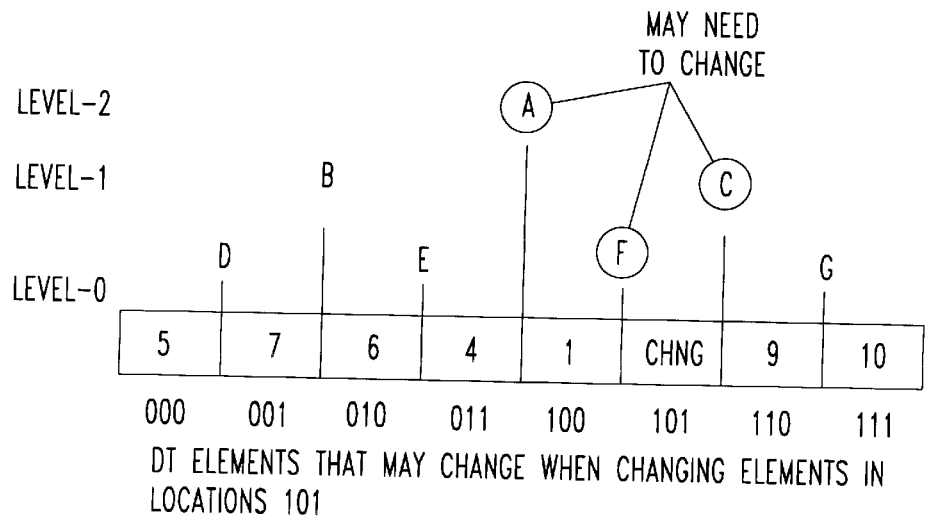
FIG. 13 shows that the key elements may change when changing elements in location 101.

When any element is changed it is possible that entries in the DT will become incorrect and will need to be updated. FIG. 13 indicates the entries that change The entries in the DT that may need to be updated when an entry in E (at position J) is changed are {for all I: 0<=I<N: DT[I][J>>(I+1)]}. The notation J>>(I+1) means the following:

Start with the binary representation of J

Shift J right by (I+1) filling in zeros from the left

For example, if J is eleven (binary 1011) and I is 2, then J needs to be shifted three places to the right, which gives 0001. In the above figure changing element at 101, may result in changes in DT[0][2], DT[1][1], and DT[2][0].

In order to determine the correct value for each entry in DT, the entries in E represented by that particular entry in the DT are compared. For example determination of the correct value of DT[2][0] requires comparing the smallest element in the lower half of E (the elements E[0–3]) with the smallest element in the upper half of E (the elements E[4–7]. After changing E[5] the smallest element in E[0–3] can be determined from the DT, but the identity of the smallest element in E[4614 7] will be determined by the (possibly new value of DT[1][2], which in turn will be determined by the possible new value of DT[0][3]. If at any point the this process results in a comparison between a valid value (E[J]) and an invalid value (E[I], where 1>=NE) then the comparison results in E[J] <E[1]. As we will see below this makes inserting and deleting elements simply special cases of changing an element.

This operation takes N reads and 1 write in the worst case, which is the same order as the for other queues, however in the worst case it is both fewer actual reads/writes, and since the locations of all the elements that need to be read can be determined from the DT there is no latency imposed by the need to read one or more entries and compare them in order to be able to determine which element(s) to read next.

Figure 14:
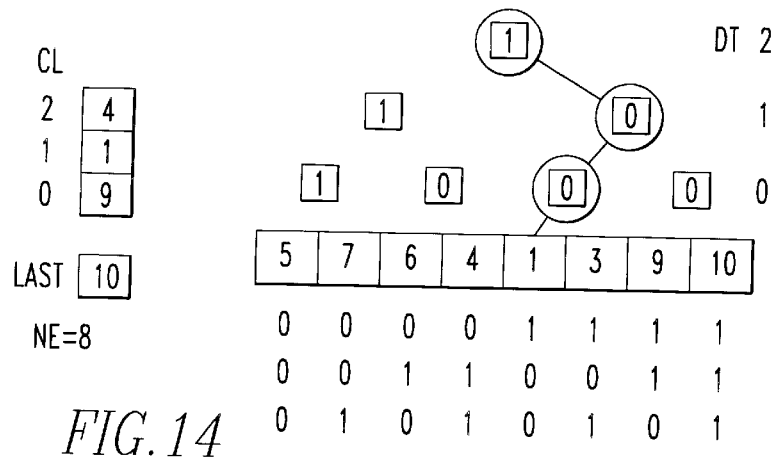
FIG. 14 shows a queue of eight elements with the minimum element located in E (4) having a value of 1.

FIG. 14 shows a queue of 8 elements with the minimum element located in E[4] having a value of 1. This is the same example that was used to illustrate insertion.

Figure 15:
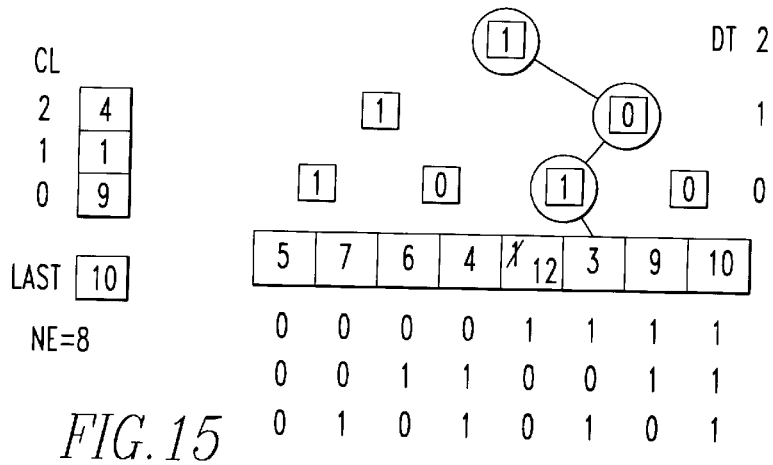
FIG. 15 shows a queue where the DT has changed to accommodate the increase of the minimum elements from 1 to 12.

If it is desired to increase the minimum element from 1 to 12, then the entries in DT along the path to E[4] (which are circled in the following figure) will have to be updated, and the CL may have to be updated. In order to update the entry DT[0][2] (the bottom of the three circled entries) the value 12 will have to be compared with the value in E[5]. Since 12>3, DT[0][2] is set to 1, yielding the new path shown in FIG. 15.

Next the value of DT[1][1] must be updated. This is done by taking the smallest element found so far (currently 3) and comparing it to the smaller of E[6] and E[7]. The smaller of E[6] and E[7] is directly determined by consulting the present value of DT[0][3]. In this case since DT[0][3]=0, E[6]=9 is smaller. Since 3<9, DT[1][1] is unchanged at 0, and the path is unchanged from before. At this point the smallest element in the right half of the queue has been found (at E[5]=3).

Now to update DT[2][0], the smallest element is compared so far (E[5]=3) with the element found by constructing DT' with D[2][0] inverted (to be 0 in this example), and finding the minimum element, which is E[3]=4. Since 4>3 DT[2][0] is remains a 1.

Since the minimum element in E, will also exist in at least one location in CL or Last (and possibly more then one) when the minimum element is updated, it will result in CL and/or Last being updated. There are two special cases. Let MI be the index at which the minimum element is stored in E before the change. If MI=NE−1 then Last is changed to new value in E[MI]. If NE−1 is an odd number, then CL[0] is updated to the new value in E[MI]. If MI=NE−2, if NE−1 is an even number then CL[0] is updated if MI=NE−3. In integer math, an entry CL[i] in CL will have to be updated if $$(((NE-1)-2^i)/2^i) \times 2^i = ((MI)/2^i) \times 2i$$

Deletion of elements from the queue is simply a special case of changing elements. This is because, since elements are not kept in priority order, an element from the middle of the array can be deleted and replaced by the rightmost element of the array. NE also needs to be decremented.

Changes to DT and CL are necessarily similar to those for changing elements in the queue.

For an example of how the apparatus 32 can be used, and in reference to other techniques which attempt to serve the same purpose as the apparatus 32 in regard to the example, see "Comparison of Rate-Based service disciplines" by H. Zhang and S. Keshav, In Proceedings of ACM SIGCOMM 91, incorporated by reference.

The method of sorting, or the method of manipulating elements, or the apparatus 32 or the priority queue described herein can be used in essentially any computer system which requires scheduler. Since insertion limits how fast packets can be used, with the apparatus 22, this insertion process can be quickened. For example, the techniques described herein can be used in an Asynchronous Transfer Mode (ATM) application. For instance, as packets or cells are transferred over an ATM network, they can arrive at a switch, or server or processor of some form or function (the network can just as well be internal to a given device as opposed to a network between devices). If traffic is substantial on the network, then the packets or cells may have to be stored in a queue until the switch is available to service them since there may be times when there are more cells that require service from the switch than the switch can provide. The method or apparatus 32 or priority queue described herein can function to receive the cells, or a value in regard to when an associated cell is to receive service (with, for instance, a pointer to its actual cell stored in another memory) and hold them until their turn for service has come. Through the comparison list or the decision tree, or both, the desired element can be quickly found from its value which is in the array through the process described above.

The values of an element can be converted into corresponding signals, and stored or operated upon by such equipment as is well known in the art.

A full discussion of ATM and associated architectures equipment, design, etc. can be found in "Gigabit Networking" by Craig Partridge, Addison-Wesley, Reading, Mass. 1993; and "Asynchronous Transfer Mode" by Martin de Prycker, Ellis Horwood, New York, Ltd., 2nd Edition, 1993, both of which are incorporated by reference herein.

Implementation of the Decision Queue Algorithm for a priority queue algorithm

Code in the appendix illustrates the basic functionality of the decision queue algorithm, it is not intended to be an example of an "optimized" software or hardware implementation, but is simply intended to demonstrate all the basic operations in the algorithm.

Much of the code is written to handle queues of arbitrary size, made out of sub queues of varying size, while such generality is illustrative, in applications with known limits of the queue size, or with differing hardware capability, any unnecessary generalities would obviously removed.

The code builds arbitrarily large queues, by creating a hierarchy of decision queues where the lowest level in the hierarchy contains the actual elements being sorted, and (assuming the priority queue is designed to select the minimum element) the smallest element in each queue at the lowest level is enqueued in a queue in the next level of the hierarchy. Assuming that each queue stores $2^N$ elements then a queue with 2 levels of hierarchy would store $2^N*2^N$ elements. Note it is not necessary that the queues at different levels in the hierarchy have the same numbers of entries. In fact, in a system with a multi-level memory hierarchy, the size of the highest level queue may be chosen so that they correspond to the sizes of the memories at the different levels. In a general purpose processor system, the size of the upper level queues might be chosen to fit inside the on-chip cache, and/or based on the word size of the system. For example, this code was written for a 32 bit system and uses queues of 32 elements which allows one of the basic data structures, the Decision Tree, for each queue to fit in one word, for easy of access and manipulation. In a hardware implementation the size can be chosen to fit the application rather then fitting the size to an already existing architecture. One obvious example of having different size queues at the same level of hierarchy would be if the number of elements to be stored was not a power of 2, then the right most queue (elements being added left to right) at some levels would be incomplete. In fact, there is no requirement that in general the queues be a power of two in size, or even that each branching point in the decision tree be a 2 way branch, 2 way branching and hence power of two sized queues is very regular in its structure and control logic which simplifies many issues. Additionally while this code replicates all the data structures for each level, it should be noted that this is only a logical duplication, in that, for example, a single hierarchy queue of 10 levels with 1024 elements and a queue with 2 hierarchies of queues of 5 levels with 32 element will have the same total number of bits in the one Decision Tree of the first queue ($1023=2^{10}-1$) or the 33 queues in the second case (1 queue of 32 queues, and 32 queues of 32 elements) with (31+32*31) bits of Decision Trees. Both will have 10 element Comparison Lists (in this code each hierarchy has its own Last element, however, since the last element of any hierarchy besides the lowest will be found in the Comparison List, those need not be duplicated. Thus, the structure which is actually duplicated is the element array, however, in the upper levels of the hierarchy this basically is just a cache, since the various Decision Trees could be descended all the way to the lowest level if needed.

In general, the three data structures (element array, comparison list, decision tree) used in this algorithm need not be divided into hierarchies of the same size, for example, a gene holding 32K elements implemented in a 32 bit system with 2048 words of (fast) internal memory and 32K words of (slow) main memory, could have one comparison list with 15 entries ($2^{15}=32K$) stored in on chip registers, and have two hierarchies of element arrays one of 1024 elements in the internal cache and the lowest hierarchy with 32L elements in external memory, and 3 hierarchies of Decision Trees of 31 bits, 32*31 bits and 1024*31 bits, stored in registers and the other 1024 words of internal memory (since there is a total of 1024*31−1 bits of Decision Trees they could fit entirely in the remainder of the internal memory but they would be accessed less efficiently.)

The use of the decision tree allows for very efficient computation of the operations Find_Min_Element and Change_Min_element. The Comparison List allows for efficient computation of the operations Insert_Element and Delete_Min. If the speed of Insert and Delete is not important, then the Comparison List can be omitted. It should be noted that different update policies may be used with the Comparison List providing different degrees of performance.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

misc/pq_comm2.c

```
#define baseN (5)      /* number of levels in each queue */
#define baseS (1<<baseN) /* size of each queue = 2^baseN */
#define baseMask (baseS -1) /* mask used to select different address ranges */
#define maxH (6)       /* maximum number of hierarchies */
define maxN (5)       /* maximum number of levels in a hierarchy */ typedef struct qnode NODE;
struct qnode {
    NODE *left;
    long D;
    long E[baseS];
    NODE *C[baseS];
};

typedef struct dheap DHEAP;
struct dheap {
    long min;
    long min_index;
    long N;
    long NL;
    long NE;
    NODE *H;
    long CL[maxH][baseN][2];
    long LastV[maxH][2];
    NODE *LastH[maxH];
    long last_val;
};
```

/* given a level L and an index I return the value of the position that the indicated
   bit will be found in the Decision Tree Level 4, Index 0 is stored in bit pos  1, tree node 'A'

Level 3, Index 0 is stored in bit pos  2, tree node 'B'
   Level 3, Index 1 is stored in bit pos  3, tree node 'C'

Level 2, Index 0 is stored in bit pos  4, tree node 'D'
   Level 2, Index 1 is stored in bit pos  5, tree node 'E'
   Level 2, Index 2 is stored in bit pos  6, tree node 'F'
   Level 2, Index 3 is stored in bit pos  7, tree node 'G'

Level L, Index I is stored in bit pos  (2^(N-1)-L) + I

As a tree

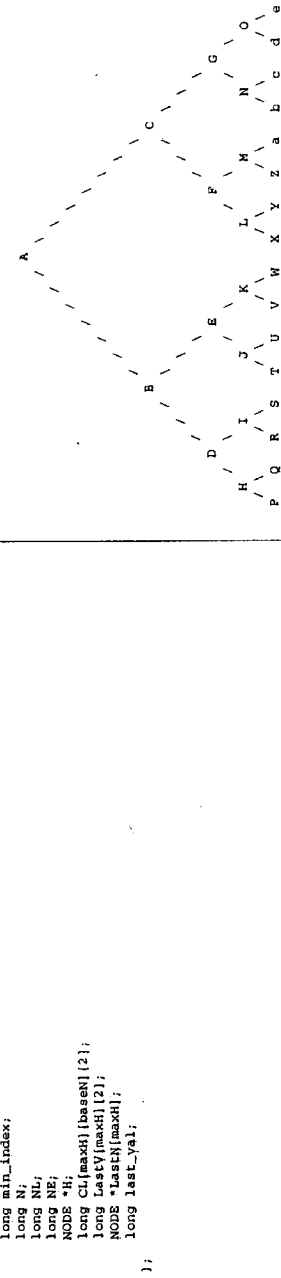

A BC DEFG HIJKLMNO PQRSTUVWXYZabcde    Tree Node Label 0 00 0000 00111111 1111222222222233    Bit Possition in DT
            1 23 4567 89012345 67890123456789 01

4 33 2222 11111111 00000000000000 00   Level 0 00 0000 00000000 00000000111111 11   Level Index
            0 01 0123 01234567 01234567890123 45
*/ misc/pq_comm2.c

```
inline
int DT_Index(long L, long I){
    return ((1<<((baseN-1)-L))+I);
} inline
int Get_DT(long DT, long L, long I)
{
    return ((DT >> DT_Index(L,I)) &1);
} inline
long Set_DT(long DT, long L, long I)
{
    return (DT | (1<<DT_Index(L,I)));
} inline
long Unset_DT(long DT, long L, long I)
{
    return (DT & ~(1<<DT_Index(L,I)));
} inline
long DT_Set_To(long DT, long L, long I, long V)
{
    long i;
    i = 1<<DT_Index(L,I);
    DT = V ? (DT | i) : (DT & ~i);
    return DT;
}

/*
    Find_Min(long DT)

For a given Decision Tree find the address of the smallest element by decending the
tree from the root, where the binary representation of the address is the same as
the binary values of path taken decending the the tree.
*/
inline
long Find_Min(long DT)
{
    long A=0,i;
    for(i=baseN-1;i>=0;i--){
        A = (A<<1) | Get_DT(DT,i,A);
    }
    return A;
}

/*
    Find_Left_Min(long DT,long A, long L)
*/
inline
long Find_Left_Min(long DT,long A, long L)
{
    long i;
    A = (A>>(L)) & 0xfffffffe;
    for(i=L-1;i>=0;i--){
        A = (A<<1) | Get_DT(DT,i,A);
    }
    return A;
}
```

The following will be used to illustrate many of the descriptions

The stored path 0->1->1->0->1 leads to the smallest element, and is also its address (indexed from 0) in the array 01101 = 13

```
                                                                    Level
                              0                                       4
                             / \
                            /   \
                           /     \
                          /       \
                         /         \
                        /           \
                       /             \
                      1               0                               3
                     / \             / \
                    /   \           /   \
                   /     \         /     \
                  0       1       1       0                           2
                 / \     / \     / \     / \
                1   0   0   1   1   0   1   0                         1
               /\  /\  /\  /\  /\  /\  /\  /\
              0 1 1 0 0 1 1 0 0 1 1 0 0 1 1 0                         0
             /\ /\ /\ /\ /\ /\ /\ /\ /\ /\ /\ /\ /\ /\ /\ /\
             1 0 1 2 2 0 1 1 1 2 0 1 3 3 2 3 2 0 1 0 2 2 0 1 1 0 0    Value
             1 4 2 5 7 2 4 9 8 4 2 1 5 1 9 4 2 6 1 3 5 2 3 9 6 3 4 5
             0 0 0 0 0 0 0 0 0 1 1 1 1 1 1 1 1 1 1 2 2 2 2 2 2 2 2 2 2 3 3
             0 1 2 3 4 5 6 7 8 9 0 1 2 3 4 5 6 7 8 9 0 1 2 3 4 5 6 7 8 9 0 1   Index
``` misc/pq_comm2.c

```
/* Find_Alt(long DT,long A, long L)

For a given Decision Tree, return the index of the smallest element along the path
    represented by the index A, with the difference that at level L the opposite path is
    taken. This is used when changing an element, to find all the elements that must be
    compared to the new value inorder to update the DT. Some examples follow

#1
Frequently we will be changing the smallest element, so the following
evaluations might be performed Find_Alt(DT,01101,0)   = 01100 = 12
Find_Alt(DT,01101,1)   = 01110 = 14
Find_Alt(DT,01101,2)   = 01000 = 8
Find_Alt(DT,01101,3)   = 00101 = 5
Find_Alt(DT,01101,4)   = 11000 = 24

However since it is possible to change any element we could also try

Find_Alt(DT,10100,0)   = 10101 = 21
Find_Alt(DT,10100,1)   = 10110 = 22
Find_Alt(DT,10100,2)   = 10010 = 18
Find_Alt(DT,10100,3)   = 11000 = 24
Find_Alt(DT,10100,4)   = 01101 = 13

Below the A marks the starting index, and the numbers mark the index
returned for each value of L, as can be seen each index returned
represents then smallest value in a subrange of the tree of size 2^L
*/
```

```
inline
long Find_Alt(long DT,long A, long L)
{
    A >>=L;
    A ^= 1;
    while(L>0){
        L--;
        A = (A<<1) | Get_DT(DT,L,A);
    }
    return A;
} inline
long Find_Min_Helper(long DT, long A, long L)
{
    do{
        A = (A<<1) | Get_DT(DT,L,A);
        L--;
    }while(L >=0);
    return A;
} long Min_Adr(DHEAP *d)
{
    NODE *n;
    long i,a=0,j;

n = d->H;
    for(i=0;i<d->NL-1;i++){
        j= Find_Min(n->DT);
        a = (a<<baseN) | j;
        n = n->C[j];
    }
    j= Find_Min(n->DT);
    a = (a<<baseN) | j;

return a;
} long Min_Adr_N(NODE *N,long l)
{
    NODE *n;
    long i,a=0,j;

n = N;
    for(i=0;i<(l-1);i++){
        j= Find_Min(n->DT);
        a = (a<<baseN) | j;
        n = n->C[j];
    }
    j= Find_Min(n->DT);
    a = (a<<baseN) | j;

return a;
}
``` misc/pq_comm2.c

```c
void Print_Node(DHEAP *d, NODE *n, long index,long s)
{
    int i,j,k;
    long tmp,div,min;

long size=1;
    for(i=1;i<=s;i++){
        size <<= baseN;
    }
    printf("-------------------------------------------------\n");
    min = Find_Min(n->DT);
    printf("min         = %10d\n",n->E[min]);
    printf("min index   = %10d\n",n->Min_Adr_N(n,s)+index);
    printf("start       = %10d\n",index);
    printf("size        = %10d\n",size);
    printf("\n");
    for(i = baseN-1;i>0;i--){
        for(j=0;j<(1<<(baseN-i-1));j++){
            printf("%2d",(long)Get_DT(n->DT,i,j));
        }
        printf("  ");
    }
    printf("\n\n");

div=1000;
    for(j=0;j<4;j++){
        for(i=0;i<(baseS);i++){
            if((size*i) < (d->NE-index)){
                tmp = n->E[i];
                printf("%2d ",(tmp/div)%10);
            } else {
                printf(" 0");
            }
        }
        printf("\n");
        div /=10;
    }
    printf("\n");

for(i=0;i<baseN;i++){
        for(j=0;j<(baseS);j++){
            for(k=0;k<((baseS>>(i))-1);j++){
                printf(" ");
                for(k=0;k<((baseS>>((baseN-i)-1))-1);k++){
                    printf(" ");
                }
                if((size*i) < (d->NE-index)) Print_Node(d,n->C[i],index+(size*i),s-1);
            }
            printf("|");
        }
        printf("\n");
    }
    for(i=0;i<(baseS);i++){
        if(size>1){
            if((size*i) < (d->NE-index)) Print_Node(d,n->C[i],index+(size*i),s-1);
        }
    }
    printf("-------------------------------------------------\n");
} void Print_Heap(DHEAP *d)
{
    int i,j,tmp,mask;

printf("-------------------------------------------------
```

```c
    printf("min         = %10d\n",d->min);
    printf("min index   = %10d\n",d->min_index);
    printf("NE          = %10d\n",d->NE);
    printf("\nL          V          A\n");
    for(j=d->NL-1;j>=0;j--){
        for(i=baseN-1;i>= 0;i--){
            printf("(%d)[%d]%8d%8d\n",j,i,d->CL[j][i][0],d->CL[j][i][1]);
        }
        printf("(%d)[L]%8d%8d\n",j,d->LastV[j][0],d->LastV[j][1]);
    }
    printf("\n");
    Print_Node(d,d->H,0,d->NL);
    printf("-------------------------------------------------\n");
} static change_bit[32] = {5,0,1,0,2,0,1,0,3,0,1,0,2,0,1,0,
                         4,0,1,0,2,0,1,0,3,0,1,0,2,0,1,0};
inline void Insert_Select_CL(DHEAP *d, long L, long A, long DT)
{
    long N,LS;
    LS=change_bit[A];
    A--;
    switch(LS){
        case 0:
            N = 5;
            break;
        case 1:
            N = Get_DT(DT,0,A>>1) ? 5 : 0;
            break;
        case 2:
            N = Get_DT(DT,1,A>>2) ?
                (Get_DT(DT,0,A>>1) ? 5 : 0) : 1;
            break;
        case 3:
            N = Get_DT(DT,2,A>>3) ?
                (Get_DT(DT,1,A>>2) ?
                (Get_DT(DT,0,A>>1) ?
                5 : 0) : 1) : 2;
            break;
        case 4:
            N = Get_DT(DT,3,A>>4) ?
                (Get_DT(DT,2,A>>3) ?
                (Get_DT(DT,1,A>>2) ?
                (Get_DT(DT,0,A>>1) ?
                5 : 0) : 1) : 2) : 3;
            break;
        case 5:
            N = 5;
            break;
        default:
            fprintf(stderr,"error in Select_CL\n");
            break;
    }
    if(LS<5){
        d->CL[L][LS][0] = (N == 5)? d->LastV[L][0] : d->CL[L][N][0];
    }
}

/*
   Insert_Comp_DT(DHEAP *d, long L, long A, long V)

Updates the Decision Tree when a new element (V) is inserted into the queue at
   location A, hierarchy level L.
*/
```

misc/pq_comm2.c

```
/*
This is done by comparing the new element against the elements in the Comparision
List. Since there is no dependency between the comparisions, they can be performed
in parallel.
*/
inline void Insert_Comp_DT(DHEAP *d, long L, long A, long V)
{
    long i,DT=0;
    for(i=0;i<baseN;i++){
        if(A & (1<<i)){
            if(V <= d->CL[L][i][0]){
                DT |= Set_DT(DT,i,A>>(i+1));
            }
        }
    }
    d->LastN[L]->DT |= DT;
    return;
} inline void Delete_Comp_DT(DHEAP *d, long L, long *rMA, long *rMV, long flag)
{
    long i,DT,MA,MV,A,LV,AMA,found_first;

MV=0x7fffffff;
    MA=0;
    AMA=0;
    DT=d->LastN[L]->DT;
    if(flag){
        A = ((d->NE-2)>>(baseN*L))&baseMask;
    } else {
        A = ((d->NE-1)>>(baseN*L))&baseMask;
    }
    DT = Unset_DT(DT,0,A>>1);

found_first =0;
    for(i=0;i<baseN;i++){
        if(A & (1<<i)){
            if(!found_first){
                MV = d->CL[L][i][0];
                found_first =1;
            } else {
                if(MV <= d->CL[L][i][0]){
                    DT = Set_DT(DT,i,A>>(i+1));
                } else {
                    MV = d->CL[L][i][0];
                    DT = Unset_DT(DT,i,A>>(i+1));
                }
            }
        }
    }

LV=d->LastV[L][0];
    for(i=0;i<baseN;i++){
        if(A & (1<<i)){
            if(LV <= d->CL[L][i][0]){
                DT |= Set_DT(DT,i,A>>(i+1));
            }
        }
    }
    d->LastN[L]->DT = DT;
```

```
    if(LV <= MV){
        *rMV=d->LastV[L][0];
        *rMA=d->LastV[L][1];
    } else {
        *rMA=MA;
        *rMV=MV;
    }
    return;
}
```

-37- misc/pq_comm2.c

```c
NODE * Make_Node(DHEAP *d, long L)
{
    int i;
    NODE *n;
    n = (NODE *)malloc(sizeof(NODE));
    n->DT = 0;
    for(i = 0 ; i < baseS ; i++ ){
        n->C[i] = NULL;
        n->E[i] = 0;
    }
    n->left = d->LastN[L];
    d->LastN[L] = n;
    if(L){
        n->C[0] = Make_Node(d,L-1);
    }
    return n;
}

NODE * Grow_Node(DHEAP *d,NODE *N, long L)
{
    int i;
    NODE *n;
    n = (NODE *)malloc(sizeof(NODE));
    n->DT = 0;
    for(i = 0 ; i < baseS ; i++ ){
        n->C[i] = NULL;
        n->E[i] = 0;
    }
    n->left = d->LastN[L];
    d->LastN[L] = n;
    i=Find_Min(N->DT);
    n->E[0] = N->E[i];
    d->LastV[L][0] = N->E[i];
    n->C[0] = N;
    n->C[1] = Make_Node(d,L-1);
    return n;
} void Grow_Heap(DHEAP *d)
{
    int i,v,a;
    d->H=Grow_Node(d,d->H,d->NL);
    d->N +=baseN;
    d->NL++;
    return;
}

DHEAP * Make_Heap()
{
    int i;
    DHEAP *d;
    d = (DHEAP *)malloc(sizeof(DHEAP));
    d->min = 0xffffff;
    d->NE = 0;
    d->N = baseN;
    d->NL = 1;
    for(i=0;i<maxH;i++){
        d->LastN[i] = NULL;
    }
    d->H=Make_Node(d,0);
    return d;
}
``` misc/pq_comm2.c

```c
void Insert(DHEAP *d, long V)
{
    long i;
    long I,OI,N;
    NODE *n;
    if(d->NE==(1<<d->N)) Grow_Heap(d);
    I = d->NE;
    OI = ((d->NE-1) >>N) & baseMask;
    N= d->N - baseN;
    n=d->H;
    for(i=d->NL-1;i>=0;i--){
        I = (d->NE >>N) & baseMask;
        OI = ((d->NE-1) >>N) & baseMask;
        d->LastN[i] = n;
        if(i && (n->C[I] == NULL)) n->C[I] = Make_Node(d,i-1);
        if(I != OI){
            Insert_Select_CL(d,i,I,n->DT);
        }
        if((I != OI) || (V <= d->LastV[i][0])){
            Insert_Comp_DT(d,I,I,V);
            d->LastV[i][0] = V;
            d->LastV[i][1] = d->NE;
            n->E[I] = V;
        }
        n = n->C[I];
        N -= baseN;
    }
    if(V <= d->min){
        d->min = V;
        d->min_index = d->NE;
    }
    d->NE++;
    return;
} void Change_Min(DHEAP *d, long NV)
{
    NODE *Path[maxH], *n;
    long i,j,I,MI,MV,NA,AI,AV,AA,L=0,NDT,WA,WAM,LMI;
    long max;
    long k;
    Path[d->NL-1] = d->H;
    n = d->H;
    for(i=d->NL-2;i>=0;i--){
        I = Find_Min(n->DT);
        n = Path[i] = n->C[I];
    }
    MV=NV;
    MA=d->min_index;
    for(i=0;i<d->NL;i++){
        if(((d->NE-1) >> (i*baseN)) == ((d->min_index) >> (i*baseN))){
            d->LastV[i][0]=MV;
        }
        if(((d->NE-1)>> (L+baseN))==(d->min_index>>(L+baseN))){
            max = ((d->NE -1)>>L)& baseMask;
        } else {
            max = baseMask;
        }
        NDT=n->DT;
        MI = (d->min_index >> L) &baseMask;
        n->E[MI]=MV;
        for(j=0;j<baseN;j++){
            WA = ((((d->NE-1 >> (i*baseN))) & baseMask) + baseS) - (1 <<(j));
            WAM = WA & baseMask;
            LMI = -1;
            if(WA & baseS){
                if(((d->NE-1) >> ((i+1)*baseN)) ==
                    (d->min_index) >> ((i+1)*baseN)){
                    LMI = Find_Left_Min(d->LastN[i+1]->DT,WAM,j);
                    if( LMI == ((d->min_index >> (i*baseN)) & baseMask)){
                        d->CL[i][j][0] = MV;
                    }
                }
            } else {
                if((((d->NE-1) >> ((i+1)*baseN)) -1) ==
                    ((d->min_index) >> ((i+1)*baseN))){
                    LMI = -2;
                    if(d->LastN[i]->left != NULL){
                        LMI = Find_Left_Min(d->LastN[i]->left->DT,WAM,j);
                        if(LMI == ((d->min_index >> (i*baseN)) & baseMask){
                            d->CL[i][j][0] = MV;
                        }
                    }
                }
            }
            AI = Find_Alt(NDT,MI,j);
            if(AI <= max){
                if(n->E[AI] < MV){
                    MV = n->E[AI];
                    MI = AI;
                }
            }
        }
        NDT = DT_Set_To(NDT,j,MI>>(j+1),(MI>>j)&1);
    }
    n->DT=NDT;
    L += baseN;
}
d->min = MV;
d->min_index = Min_Adr(d);
}

/*
Delete_Min
By using the Comparison List and decision tree, only two reads from the
array E are needed to perform a delete, beyond those needed to change the minimum
element
*/
void Delete_Min(DHEAP *d)
{
    long i,L=0,I,NI,l,WI,MI,MV,NA,change;
    NODE *n;
    if(d->NE == 0) return;
    if(d->NE == 1){
        d->NE--;
        return;
    }
``` misc/pq_comm2.c

```c
    int i,num,min,N,seed,j,cnt=0,tmp;

d=Make_Heap();

if((argc < 2) || (argc > 3)){
        printf("usage: pq N [seed]\n");
        exit(0);
    }

N = atol(argv[1]);
    seed = (argc == 3)?(atol(argv[2])):time(0);
    srandom((unsigned int)seed);
    printf("seed = %d\n",seed);
    while(1){
        if(cnt==0){
            printf(".");
            fflush(stdout);
            cnt=1;
        }
        if(N > d->NE)  num=random()%(N- d->NE);
        for(i=0;i<num;i++){
            tmp=random()%9999;
            printf("inserting %10d\n",tmp);
            Insert(d,tmp);
            Print_Heap(d);
        }
        if(d->NE > 0) num=random()%(d->NE);
        for(i=0;i<num;i++){
            printf("DELETING\n");
            Delete_Min(d);
            printf("MIN = %10d  (%10d\n",d->min,d->min_index);
            Print_Heap(d);
        }
        cnt--;
    }
    exit(0);
}
```

```c
    if(d->NE > (d->min_index+0)) Change_Min(d,d->LastV[0][0]);

for(i=0;i<d->NL;i++){
        change=0;
        I = ((d->NE-1) >>L) & baseMask;
        NI = ((d->NE-2) >>L) & baseMask;
        if(I != NI){
            if(I==0){
                d->LastN[i] = d->LastN[i]->left;
            }
            if(i==0){
                if (I & 1){
                    d->LastV[i][0] = d->CL[i][0][0];
                } else {
                    /* memory read */
                    d->LastV[i][0] = d->LastN[i]->E[NI];
                }
                l = change_bit[I];
                if(l<5){
                    WI = (NI - (1<<(i+1))) & baseMask;
                    n=d->LastN[i];
                    n->DT = Unset_DT(n->DT,l,I>>(l+1));
                    if(NI <= WI) n = n->left;
                    if(n){
                        WI = Find_Left_Min(n->DT,WI,l);
                        /* memory read */
                        d->CL[i][l][0] = n->E[WI];
                    }
                    change=1;
                }
            } else {
                change=1;
            }
            Delete_Comp_DT(d,i,&NA,&MV,(I != NI));
            d->LastV[i+1][0]=MV;
            if(d->LastN[i+1]){
                I = ((d->NE-1) >>(L+baseN)) & baseMask;
                NI = ((d->NE-2) >>(L+baseN)) & baseMask;
                MI = (MA >> (L+baseN))&baseMask;
                d->LastN[i+1]->E[NI] = d->LastV[i+1][0];
            }
        }
        L += baseN;
    }
    MI=Find_Min(d->H->DT);
    d->min=d->H->E[MI];
    d->min_index = Min_Adr(d);

d->NE--;
} main(int argc, char **argv)
{
    DHEAP *d;
```

-40-

What is claimed is:

1. A method for sorting comprising the steps of:

forming a decision tree comprised of at least a first level having at least a first entry with either a first result or a second result corresponding to values as they fill a queue;

reading the result in the first entry of the first level of the decision tree; and choosing the value from the queue corresponding to the result in the first entry.

2. A method for sorting comprising the steps:

forming a decision tree comprised of N levels, where $N \geq -1$ and is an integer and corresponds to a queue of $2^N$ elements each having a value, as the queue is filled, each level L having $2^L$ entries where $L \geq 0$ and is an integer, each entry having either a first result or a second result corresponding to values in the queue;

reading the results in the entry of the 0th level;

reading the results in the entries of subsequent higher levels, if any, depending on the result read in a previous lower level; and choosing the value from the queue corresponding to the result in the entry in a highest level.

3. A method as described in claim 2 wherein $L \geq 1$ and wherein the step of reading the results in the entries of the subsequent higher levels includes the step of reading the entry in the first level depending on the result in the entry in the 0th level; and wherein the choosing step includes the step of choosing the value from the queue corresponding to the result read in the entry of the first level.

4. A method as described in claim 3 wherein the forming step includes the steps of writing a first value into the first element of the queue;

writing a second value into the second element of the queue;

comparing the second value with the first value;

writing the first result or second result into a corresponding entry of the first level for the corresponding elements depending on whether the first value is greater than or less than the second value, respectively; and repeating the step of writing, comparing and writing a third value in regard to the second value and a corresponding entry; and comparing the third value to the smallest of the first and second values, and writing the first result or second result into a corresponding entry of the 0th level for the corresponding elements depending on whether the third value is greater than or less than the second value, respectively.

5. An apparatus for sorting comprising:

an array E of size $2^N$ where elements are stored and where $N \geq 1$ and is an integer, with the elements in array E indexed from 0 to $2^N-1$;

a first memory maintaining a value NE equal to how many elements are stored in the array E;

a decision tree of $2^N-1$ bits, where the number of bits in its part I is $2^N/2^{I+1}$, which describes the relative ordering of elements in array E;

a comparison list array CL of size N, where CL[i] contains a value of a lower element within E[l] and E[h] where:

$$l = \left\lfloor \frac{NE - 1 - 2^i}{2^{i+1}} \right\rfloor 2^{i+1}; \text{ and}$$

$$l + 2^i - 1 = h$$

a second memory maintaining a value L equal to the value of a last element in the array E; and a controller which inserts elements into array E in contiguous memory locations in an unsorted manner, modifies the decision tree to describe the relative ordering of the elements of the array E, modifies the array CL so CL[i] contains the value of the lower element within E[l] and E[h]; updates the value L with the value of each new element added to the array E, and updates the value NE as each new element is added to the array.

6. A priority queue comprising:

a memory in which elements are stored; and a controller which stores the elements in the memory with no memory reads and a constant number of memory writes so a smallest element in the memory can be identified, said controller connected to the memory.

7. A priority queue as described in claim 6 wherein the memory includes a register file having a decision tree and a comparison list.

8. A method for manipulating elements comprising the steps of:

storing a first element having a value in a first queue location in an element queue having a size which stores $2^N$ elements, where $N \geq 2$ and is an integer;

updating in a register how many elements are in the queue and the value of the first element;

storing a second element having a value in a second queue location of the element queue contiguously with the first element;

updating in the register how many elements are in the queue and the value of the second element;

comparing the value of the second element with the value of the first element to yield a first comparison result corresponding to which value of the first and second elements is larger;

storing a first comparison result in a first location of a plurality of locations of a decision tree, said plurality of locations corresponding to a plurality of levels;

updating a first comparison element of a plurality of comparison elements of a comparison list array, each comparison element associated with a level of the plurality of levels, the comparison element updated corresponding to the second queue location of the element queue in which the second element is stored and in the first queue location of the element queue in which the first element is stored;

storing a third element having a value in a third queue location in the element queue contiguously with the second elements;

updating in the register how many elements are in the queue and the value of the third element;

comparing the value of the third element with the value of the first and second elements which is smaller to yield a second comparison result corresponding to which value of the first and second elements and the third element is smaller;

storing the second comparison result in a second location of the decision tree;

updating a second comparison element corresponding to the third queue location in which the third element is stored;

storing a fourth element having a value in a fourth queue location in the element queue contiguously with the third element;

updating in the register how many elements are in the queue and the value of the fourth element;

comparing the value of the fourth element with the third element to yield a third comparison result corresponding to which value of the third and fourth elements is smaller;

storing the third comparison result in a third location of the decision tree;

comparing the value of the third element and fourth element which is smallest with the value of the first element and second element which is smallest to yield a fourth comparison result corresponding to which value of the first, second, third or fourth elements is smaller;

storing the fourth comparison result in the second location of the decision tree;

updating the comparison list;

changing the value of the third element in the element queue to a new value;

comparing the new value to the value of the fourth element to yield a fifth comparison result;

storing the fifth comparison result in the third location of the decision tree;

comparing the fifth comparison result with the first comparison result of the decision tree to obtain a sixth comparison result;

storing the sixth comparison result in the second location of the decision tree;

updating the comparison list;

finding the queue location in the element queue which has the smallest value by only reading the comparison result in the decision tree; and obtaining the smallest value.

* * * * *